United States Patent [19]

Lakin et al.

[11] Patent Number: 4,840,222

[45] Date of Patent: Jun. 20, 1989

[54] HEAT SINK AND MOUNTING ARRANGEMENT THEREFOR

[75] Inventors: Bryan L. Lakin; William P. W. McDaniel, both of Springfield, Mo.

[73] Assignee: Fasco Industries, Inc., Boca Raton, Fla.

[21] Appl. No.: 805,965

[22] Filed: Dec. 6, 1985

[51] Int. Cl.⁴ ............ F28F 7/00; H02K 11/00; H02K 5/18; H02K 9/00

[52] U.S. Cl. .................. 165/47; 165/80.3; 165/185; 310/64; 310/65; 310/68 D

[58] Field of Search ............ 165/80.1, 80.2, 80.3, 165/47, 185; 310/64, 65, 68 D

[56] References Cited

U.S. PATENT DOCUMENTS

| | | | |
|---|---|---|---|
| 2,383,669 | 8/1945 | Moore | 310/68 D |
| 2,833,966 | 5/1958 | Goodier et al. | 165/80.3 |
| 3,083,314 | 3/1963 | Ratajski . | |
| 3,196,317 | 7/1965 | Potter et al. . | |
| 3,353,078 | 11/1967 | Maynard | 310/68 R |
| 3,602,793 | 8/1971 | Grozinger | 310/68 |
| 3,666,978 | 5/1972 | Renner . | |
| 3,824,684 | 7/1974 | Wheeler . | |
| 3,831,062 | 8/1974 | Haug et al. . | |
| 3,871,069 | 3/1975 | Grieb . | |
| 4,103,193 | 7/1978 | Ito . | |
| 4,125,792 | 11/1978 | Schmider . | |
| 4,144,932 | 3/1979 | Voigt . | |
| 4,259,603 | 3/1981 | Uchiyama et al. . | |
| 4,286,186 | 8/1981 | Hagenlocher et al. | 310/68 D |
| 4,311,933 | 1/1982 | Riggs et al. . | |
| 4,396,850 | 8/1983 | Herr | 310/68 R |
| 4,400,858 | 8/1983 | Goiffon et al. . | |
| 4,404,488 | 9/1983 | Herr . | |
| 4,456,843 | 6/1984 | Heyne et al. . | |
| 4,510,404 | 4/1985 | Barrett et al. . | |

FOREIGN PATENT DOCUMENTS

| | | | |
|---|---|---|---|
| 2542483 | 4/1977 | Fed. Rep. of Germany | 310/64 |
| 644130 | 8/1962 | Italy | 310/68 D |
| 0832659 | 5/1981 | U.S.S.R. | 310/68 D |
| 0400594 | 10/1933 | United Kingdom | 310/68.4 |
| 1151857 | 5/1969 | United Kingdom | 310/68 D |

Primary Examiner—Albert W. Davis Jr.
Assistant Examiner—John K. Ford
Attorney, Agent, or Firm—Rogers, Howell, Moore & Haferkamp

[57] ABSTRACT

A generally annular heat sink is adapted to be compressed and inserted within the cylindrical sleeve of a motor or the like, with the spring action of the heat sink being sufficient to hold it in place after it is released. Channels along the outer surface of the heat sink provide reservoirs for a potting compound to further fix the heat sink and improve the thermal conductivity between the heat sink and sleeve. A PC board is mounted to the heat sink only through the electrical leads of power transistors to provide a limited amount of flexure to accommodate insertion and removal of the heat sink. In a second embodiment, a generally rectangular heat sink is mounted in a conduit box by tabs which are deformed to fit within channels along opposite edges of the heat sink. An access hole in the side of the conduit box and aligned with the channel permits a pin to be inserted therethrough to push the tabs out of the channel and release the heat sink and PC board from the conduit box.

14 Claims, 2 Drawing Sheets

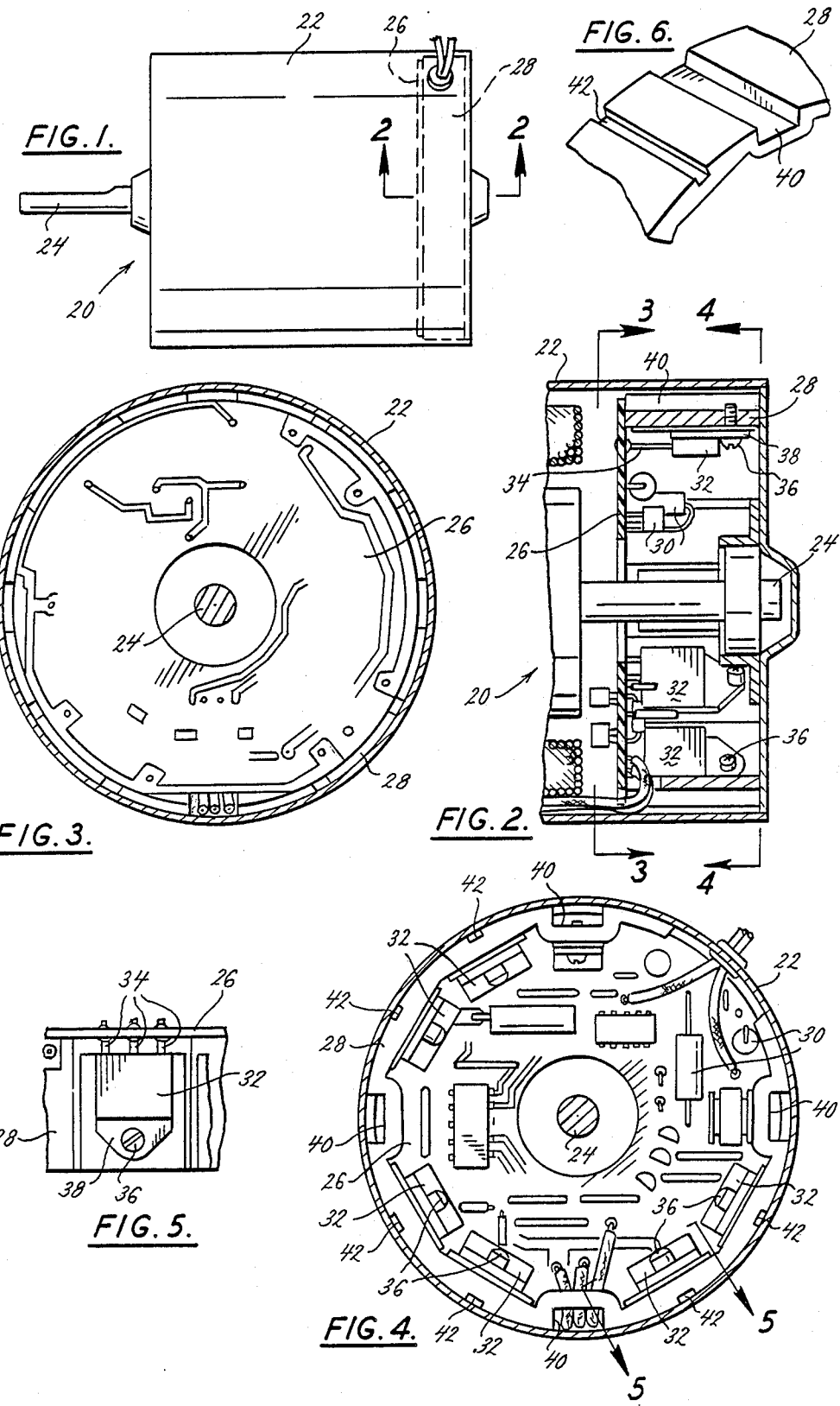

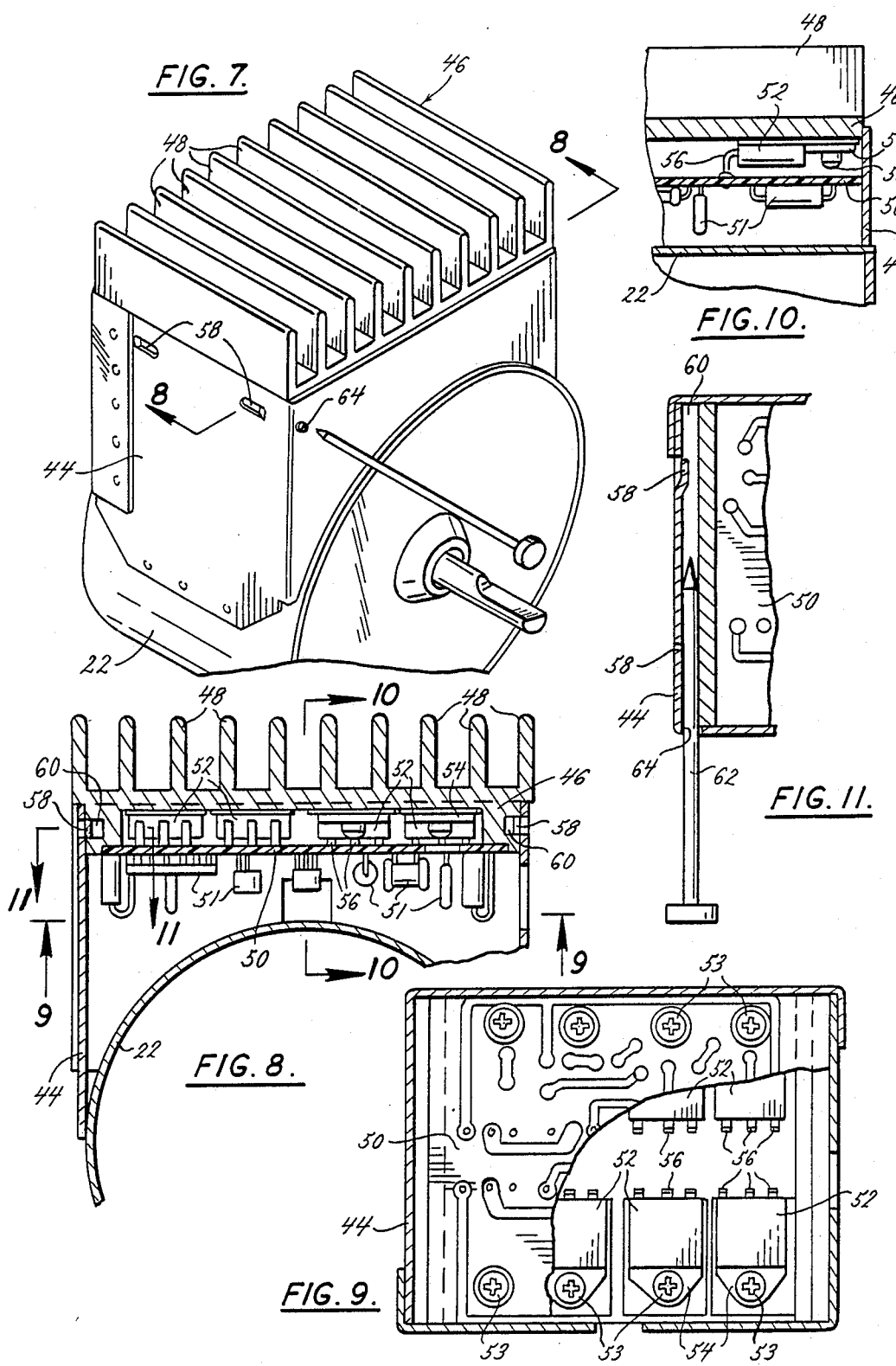

HEAT SINK AND MOUNTING ARRANGEMENT THEREFOR

BACKGROUND AND SUMMARY OF THE INVENTION

With the development of electronic control circuits, and their adaption for use with electric motors and the like, there has developed a need and desire to mount these electronic circuits in close proximity to the motor. This enhances the utility of the electronics and results in a more compact design which is also more efficient and less expensive to manufacture. However, one significant problem with the association of these electronic circuits with an electric motor or the like is the deleterious effect that heat has on these devices. As is well known, electric motors can generate a significant amount of heat, and electronic components can be very heat sensitive, especially those power transistors or other switching devices which might be used to switch significant amounts of current to the motor windings.

In the prior art, heat sinks have been developed for the mounting of those higher power electronic components requiring heat sinking, but these heat sinks have generally been merely attached by bolting or screwing them onto the conduit box or inside the shell of the motor. Of course, the mounting of the heat sink can be critical in that some attention must be paid to dissipating the heat from the heat sink. Generally, this can be done by either exposing the cooling fins of the heat sink to a steady circulation of air or to the exterior of the enclosure, or by bringing the heat sink into close thermal contact with a surrounding enclosure. In some designs, the heat sink is coupled to the shaft which rotates it as the motor is operated. In other designs, the heat sink is covered but a steady draft of cooling air is blown over the heat sink. In still other designs, the heat sink is made of sufficient capacity to operate satisfactorily without exposure to exterior air. However, these designs are susceptible to heat build-up and must of necessity contain greater material and hence be more expensive than those designs exposed to exterior air.

The inventor herein has succeeded in developing two new heat sink designs and mounting for them which represents a dramatic improvement over the prior art in compactness of design, efficiency of operation, and ease in installing and removing the heat sink along with its associated electronic circuitry for repair or replacement thereof. In the first design, a generally circular PC board is mounted across the open face of a generally annular heat sink through the electronic leads of power transistors. As is known in the art, the power transistors are rigidly mounted by their cases to the heat sink and thermally coupled thereto to maximize the efficiency of operation of the heat sink, and the electronic leads from the power transistors are connected by soldering or the like to the PC board itself. By making no other physical connections between the PC board and the heat sink, a limited amount of flexure is permitted therebetween. Therefore, with this generally annular design, the heat sink and PC board is uniquely suited for insertion within the sleeve of an electric motor or the like by compressing the heat sink and then releasing it so that it "springs" against the outer shell of the motor sleeve and is held in place through spring tension. This is achieved by making the arcuate shape of the generally annular heat sink somewhat greater than the circular shape of the sleeve. Additionally, the heat sink is formed with a plurality of grooves or channels extending across the outer face thereof which can be filled with a suitable potting material or fixative to both fix the heat sink against the sleeve and to provide a closer thermal coupling between the heat sink and sleeve so as to improve the heat transfer characteristic therebetween. This improved coupling and heat transfer characteristic increases the efficiency of operation of the heat sink. Furthermore, this design permits all of the electronics to be interiorly mounted in the sleeve of the motor which provides a unique compact mounting, eliminating any conduit box. Additionally, removal and replacement or repair of the electronic circuitry is easily achieved by disconnecting a few wires, releasing the potting compound with an appropriate method as is known in the art, and removing the heat sink and associated PC board by compressing the heat sink and withdrawing it axially from the motor sleeve. Thus, this heat sink design combines all of the desired characteristics for a heat sink including efficiency of operation, compactness of design, and ease in installation and removal. Furthermore, the heat sink can be constructed of extruded aluminum such that it is easily and cheaply manufactured.

For those motor designs which include a conduit box, the inventor has succeeded in developing a unique mounting arrangement which is not only inexpensive and easily manufacturable, but which also maximizes the operation of the heat sink by exposing the cooling fins to the exterior air. Still another advantage of this heat sink and its mounting is that it is simply and easily installed by deforming tabs cut into the side wall of the conduit box into channels integrally formed in opposite sides of the heat sink. An access hole to each channel permits the insertion of a pin through the channel which forces the tabs back into their preassembled configuration for removal of the heat sink and PC board for repair or replacement. Not only is removal easily accomplished, but the tabs are reusable for replacement of the heat sink and PC board. With integrally formed tabs in the side wall of the conduit box, there is no hardware to be lost or misplaced and additional tabs can easily be cut or punched in the conduit side wall should the original tabs break off. This heat sink design comprises many of the same functional advantages and features in a somewhat different structural arrangement from the first design as it is for use with a conduit box. These functional features include optimal efficiency by exposing cooling fins to exterior air, ease in installation and removal, with repeated removal being possible with the same structure, the elimination of mounting hardware, compact design, and maximum utilization of available space.

Some of the principal advantages and features of the invention have been summarized for convenience above. A fuller understanding of the invention and a complete description thereof is contained in the drawings and description of a preferred embodiment which follows.

BRIEF DESCRIPTION OF THE DRAWINGS

FIG. 1 is a side view of an electrical motor with the annular heat sink contained therein;

FIG. 2 is a partial cross sectional view of the annular heat sink contained within the motor sleeve;

FIG. 3 is a cross sectional view taken along the plane of line 3—3 in FIG. 2 and detailing the PC board as mounted to the annular heat sink;

FIG. 4 is a cross sectional view taken along the plane of line 4—4 in FIG. 2 and detailing the mounting of the annular heat sink within the motor sleeve;

FIG. 5 is a partial view taken along the plane of line 5—5 in FIG. 4 detailing the mounting of the power transistor to the heat sink;

FIG. 6 is a partial perspective of the annular heat sink detailing the channels formed therein;

FIG. 7 is a perspective view of the second embodiment of the heat sink for use and mounting in a conduit box;

FIG. 8 is a partial cross sectional view taken along the plane of line 8—8 in FIG. 7 and detailing the channel mounting;

FIG. 9 is a partial cross sectional view taken along the plane of line 9—9 in FIG. 8 and broken away to detail the mounting of the power transistors to the heat sink;

FIG. 10 is a partial cross sectional view taken along the plane of line 10—10 in FIG. 8 further detailing the mounting of the power transistors to the heat sink; and FIG. 11 is a partial cross sectional view detailing the insertion of the pin through the channel to release the heat sink and PC board from its mounting.

DETAILED DESCRIPTION OF THE PREFERRED EMBODIMENT

As shown in FIG. 1, an electric motor 20 or the like generally has a cylindrical sleeve 22 surrounding and enclosing it, with an output shaft 24 extending along the central axis thereof. This cylindrical sleeve 22 can be extended in length to provide a convenient location for mounting a PC board 26 and an associated heat sink 28 within the sleeve 22 so as to maintain the overall cylindrical shape of the motor 20. As best shown in FIGS. 2-4, the PC board 26 is generally a circular flat disk with a plurality of components 30 mounted thereon and soldered thereto, as known in the art. Also mounted to the PC board 26 are up to six power transistors 32 with their leads 34 extending through the PC board 26, and with a screw 36 extending through the case 38 thereof to mount it to the generally annular heat sink 28. Thus, the power leads 34 of transistors 32 provide the only mechanical connection between the PC board 26 and heat sink 28. With this construction, a limited amount of radial flexure is permitted between the heat sink 28 and PC board 26.

As best shown in FIG. 6, a plurality of channels 40, 42 of varying dimension are formed along the outer surface of the heat sink 28. These channels 40, 42 provide a convenient structure to grasp the heat sink 28 and compress it for insertion or removal from the sleeve 22, and also provide a reservoir for a potting compound, such as RTV, which serves to fix the annular heat sink 28 in position and improve the thermal coupling between heat sink 28 and sleeve 22. As is best shown in FIG. 4, the annular heat sink 28 extends around virtually the entire circumference of PC board 26 to thereby maximize the thermal coupling between the heat sink 28 and sleeve 22. Of course, the heat sink 28 can be made wider, but this would require a longer sleeve 22.

A second embodiment is shown in FIGS. 7-11. In this embodiment, a conduit box 44 is secured around the periphery of shell 22, and heat sink 46 is generally rectangular shaped and includes a plurality of cooling fins 48 along the back surface thereof. As in the first embodiment, a PC board 50 containing various electronic components 51 is connected to the heat sink 46 by a plurality of power transistors 52 with screws 53 extending through the case or mounting tab 54, and the electrical power leads 56 soldered directly to the PC board 50.

In this embodiment, the PC board 50 and heat sink 46 is secured to the conduit box 44 by one or more tabs 58 which are cut or stamped into the side wall of conduit box 44. These tabs 58 are deformed into a channel 60 formed along either edge of heat sink 46 to thereby mount the PC board 50 and heat sink 46, as best shown in FIGS. 8 and 11. These tabs 58 (in conduit box 44) are generally formed by thin sheet metal and are integral with the conduit box 44. Heat sink 46 may be made of extruded aluminum, roll formed aluminum stock, or other similar material, as known in the art, and channels 60 can be integrally formed therein.

As shown in FIGS. 7 and 11, removal of heat sink 46 and PC board 50 is easily achieved through insertion of a pin 62 or the like through an access hole 64 in conduit box 44. Insertion of the pin 62 along the channel 60 forces the deformed tabs 58 to return to substantially their original location which permits the PC board 50 and heat sink 46 to be easily removed from the conduit box 44. Thus, this embodiment optimizes the cooling efficiency of heat sink 46 by exposing the cooling fins 48 to the exterior air, and also provides quick and easy installation and removal with no hardware.

There are various changes nd modifications which may be made to the invention as would be apparent to those skilled in the art. However, these changes or modifications are included in the teaching of the disclosure, and it is intended that the invention be limited only by the scope of the claims appended thereto.

What is claimed is:

1. In a dynamoelectric machine having a generally cylindrical shell surrounding the exterior thereof, and an electronic circuit associated therewith, the improvement comprising a generally arcuate shaped heat sink for mounting at least a portion of the electronic circuit, said heat sink having means to releasably grip the inner surface of the shell to mount the heat sink therein and be in substantially close thermal contact therewith, the releasable gripping means comprising sufficient resiliency and an outer radius of curvature sufficiently different from the curvature of the shell so that when compressed, inserted therein and released, the heat sink expands against the shell.

2. The device of claim 1 wherein the electronic circuit is mounted to a PC board, said portion of the electronic circuit being mounted to the heat sink by having its electrical leads connected to the PC board, and the PC board being oriented normal to the axis of the shell and heat sink.

3. The device of claim 2 wherein the heat sink has means defining at least one cavity between the heat sink and the shell to receive a fixative to further secure the heat sink thereto.

4. The device of claim 2 wherein the only physical connection between the PC board and the heat sink is through said electrical leads.

5. The device of claim 4 wherein the heat sink is made from extruded aluminum.

6. The device of claim 4 wherein the heat sink is made from roll formed aluminum.

7. The device of claim 1 wherein the heat sink has a radius of curvature greater than that of the shell.

8. The device of claim 7 wherein the arc length of the heat sink extends through and contacts greater than 180° of curvature about the shell.

9. The device of claim 8 wherein the arc length of the heat sink extends through and contacts almost all of the curvature about the shell.

10. In a dynamoelectric machine having a generally cylindrical shell surrounding the exterior thereof, and an electronic circuit associated therewith, said electronic circuit being mounted to a PC board, the improvement comprising a generally arcuate shaped heat sink, at least some of the components of the electronic circuit being physically mounted directly to the heat sink and in close thermal contact therewith, said physically mounted components having their leads connected to the PC board, said leads being the only physical connection between said PC board and heat sink, said leads permitting limited relative movement between the PC board and heat sink, and said heat sink being resilient and having an outer radius of curvature sufficiently different from that of the shell so that when compressed, inserted therein and released, the heat sink expands against the shell and is releasably retained in place.

11. The device of claim 10 wherein the PC board is generally circular and oriented generally perpendicular to the central axis of the shell and heat sink.

12. The device of claim 10 wherein the heat sink has means defining at least one channel along its outer periphery, said channel being adapted to receive a suitable potting material or fixative.

13. The device of claim 10 wherein the heat sink is made from roll formed aluminum and has an arc length extending through greater than 180° of curvature and contacts the shell along substantially all of said arc length.

14. The device of claim 10 wherein the heat sink is made from extruded aluminum and has an arc length extending through greater than 180° of curvature and contacts the shell along substantially all of said arc length.

* * * * *